June 14, 1938.  P. FREY  2,120,425

PERAMBULATOR

Filed Dec. 10, 1936

Inventor
Peter Frey
by Otto R. Wernick
Atty.

Patented June 14, 1938

2,120,425

UNITED STATES PATENT OFFICE 2,120,425

PERAMBULATOR

Peter Frey, Chicago, Ill.

Application December 10, 1936, Serial No. 115,203

2 Claims. (Cl. 280—36)

The invention relates to perambulators and has, among its principal objects, the provision of a device which is simple in construction, relatively light in weight, and which may be extended for use and collapsed when in disuse and thereby reduce the space necessary to store the device and facilitate transportation and carrying.

The invention also has as an object the provision of a main frame including spaced side frame members providing a support for a seat or other body supporting element, said frame having a handle and a truck, with another truck arranged in rear of the former, the latter being connected with the main frame and providing means for causing the seat to be arranged in operative and inoperative positions upon distention and collapse of said device. The invention also has as an object the provision of a main frame formed of a single element fashioned to provide a handle, a space for the reception of a seat or other body supporting element, a foot rest and part of a truck frame. The invention has these and other objects, all of which will be explained in detail and more readily understood when read in connection with the accompanying drawing, which illustrates one embodiment of the invention, it being evident that changes and modifications may be resorted to without departing from the spirit of the appended claims forming a part hereof.

In the drawing, Fig. 1 is a perspective view of the device;

Figure 1:
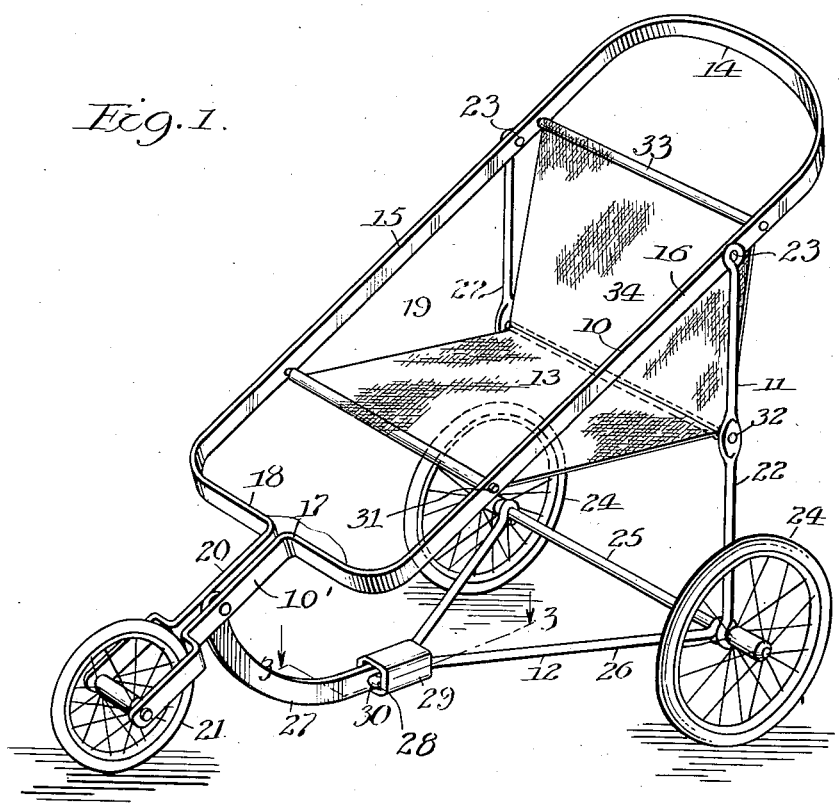

The particular structure shown in the drawing includes a main frame 10, a truck frame 11, a strut element 12, and a seat or body supporting element 13. The main frame 10 is in the present structure fabricated of a single piece of metal bent intermediate its ends to provide a handle 14, and the side frame elements respectively designated 15 and 16. These last-mentioned side frame elements are respectively bent as at 17 to produce the cross piece 18 which provides a foot rest in addition to means for maintaining this end of the side frames in spaced relation to each other and thus form the opening 19. The material of said side frames is extended beyond the cross piece 18 and bifurcated as at 20 for the reception of the wheel or truck 21. A truck frame, generally designated 11, is connected with the main frame, the uprights 22—22 of the truck frame being pivoted to said main frame at 23.

This truck frame has wheels 24 mounted upon the axle 25. The strut 12 extends between the truck frame 11 and lower end of the main frame 10 and is composed of two elements 26 and 27, respectively, and pivotally connected with said truck frame 11 and the bifurcated portion 20 of the main frame 10. This strut 12 has a portion 26 which is substantially V-shaped and thus assists to maintain the lower ends of the uprights 22—22 in spaced relation to each other, and this strut is of a jointed character which breaks at 28 and is provided with a connector or coupler 29 which releasably couples these elements to allow and prevent breaking of this strut at the joint 30. The element 27 which is connected with the shank 10' has its free end bifurcated as shown at 27' and is thus formed to receive the adjacent end of the strut 12. The coupler 29 is of a tubular character to releasably connect said elements 26 and 27.

Figure 2:
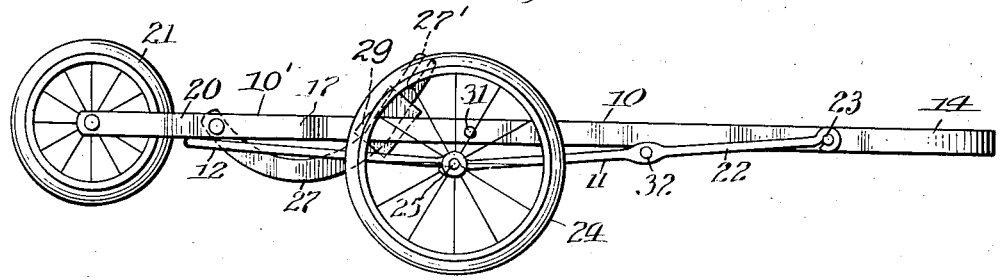
Fig. 2 is a view showing the device collapsed.
Figure 3:
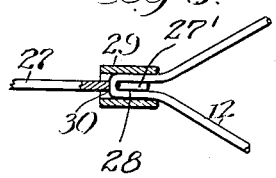
Fig. 3 is a view of a detail of construction employed in the device.

The main frame 10 is provided with spaced cross bars, respectively designated 31 and 32, and the truck frame 11 is also provided with a similar element designated 33. The seat 13 is formed of a strip of fabric having its opposite ends respectively secured to the cross bars 31 and 33, the cross bar 32 of the truck 11 being located to produce the back rest 34 and the seat portion 13 when the elements of said device are arranged in the functionally operative relation thereof shown in Fig. 1, in which relation the seat portion assists to prevent relative spreading between the front and rear wheels. As before stated, the device is capable of being collapsed as shown in Fig. 2. To accomplish this advantage, the coupler or connector 29 is moved relatively to the joint 30 to allow the strut 12 to break at said joint. Since a pivotal connection is provided between the elements of this strut 12, the main frame and truck frame 11 and said truck frame is also pivoted to the main frame, it is believed manifest that these elements may be moved with relation to each other to allow said elements to assume the collapsed condition of said elements as shown in Fig. 2, in which condition transportation or carrying of the device is facilitated.

From the foregoing explanation of the construction of the device, it is manifest that a simple, inexpensive and relatively light weight device is produced which may be collapsed when in disuse and extended for use.

Having described the invention, what I claim and desire to cover by Letters Patent is:

1. In a device of the kind described the combination of a main body supporting frame comprised of spaced seat supporting side rails, said side rails being formed to provide a closure at one end providing a foot rest, said frame being formed at said last mentioned end to provide a shank and a bifurcation for the reception of a truck, a seat located between said side rails, elements pivotally secured to the respective side rails providing a truck frame, a collapsible strut extending between said truck frame and being connected to the shank of the main frame, a member carried by the truck frame and connecting said elements of the truck frame and a member extending across the space between the side rails of the main frame to which said seat is connected, said truck frame providing means causing distention and collapse of said seat portion upon movement of said truck frame relative to the main frame.

2. In a device of the kind described the combination of a main body supporting frame comprised of spaced seat supporting side rails, a truck frame pivotally secured to the main frame, a collapsible strut extending between and pivotally connected to said truck and main frame, a member connecting said side rails of the main frame and a member connecting said members of the truck frame, a flexible seat connected with said last mentioned members of said main and truck frame, said truck frame providing means causing distention and collapse of said seat portion and said seat providing means for limiting movement of said truck frame in an outward direction, said strut providing means for limiting movement of said truck frame in the opposite direction when in functionally operative position said main frame being formed intermediate its ends to provide a closure and a portion extending from said closure having a truck, said member connecting the side rails of said main frame being spaced from the closed end of said main frame to thereby provide a space adjacent said seat for the reception of a portion of the legs of a person.

PETER FREY.